Figures 1, 2:
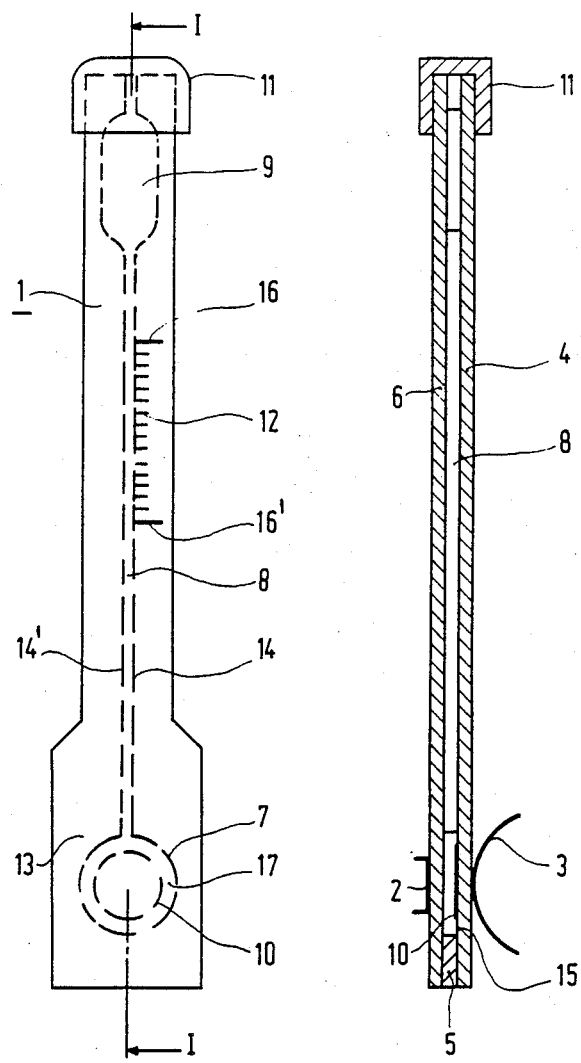

United States Patent [19]

Steinseifer et al.

[11] Patent Number: 4,793,071
[45] Date of Patent: Dec. 27, 1988

[54] ARRANGEMENT FOR MEASURING THE RELATIVE DISTANCE OF CLOSELY ADJACENT OBJECTS

[75] Inventors: Dieter Steinseifer, Siegen; Ivar-Rudolf Schwertner, Wenden, both of Fed. Rep. of Germany

[73] Assignee: U.S. Philips Corporation, New York, N.Y.

[21] Appl. No.: 118,482

[22] Filed: Nov. 6, 1987

[30] Foreign Application Priority Data

Nov. 10, 1986 [DE] Fed. Rep. of Germany ..... 36388334

[51] Int. Cl.⁴ .............................................. G01B 5/14
[52] U.S. Cl. .................................... 33/657; 33/147 C
[58] Field of Search .................. 33/657, 143 R, 147 R

[56] References Cited

U.S. PATENT DOCUMENTS 1,752,964  4/1930  Prange ............................. 33/147 E
2,153,534  4/1939  Faught ................................. 33/657
2,162,425  6/1939  Faught ............................. 33/143 R Primary Examiner—Harry N. Haroian
Attorney, Agent, or Firm—Robert T. Mayer

[57] ABSTRACT

The invention relates to an arrangement for measuring the relative distance of closely adjacent objects, in particular for measuring and adjusting the distance between a printing head and a roller in needle printers, in which the chamber of a distance measuring sensor filled with liquid, which chamber is bounded by a diaphragm-like wall, is reduced in volume by deflection, while a part of the liquid escapes into an ascending conduit visible from the outside. This arrangement can be particularly readily manipulated in that the distance measuring sensor (1) comprises a rigid base layer (4), to which a solid intermediate layer (5) is applied, which has recesses for forming the chamber and the ascending conduit adjoining an opening of the chamber (7), which are closed by the rigid base layer (4) and a rubber-elastic at least partly transparent covering layer (6).

9 Claims, 1 Drawing Sheet

ARRANGEMENT FOR MEASURING THE RELATIVE DISTANCE OF CLOSELY ADJACENT OBJECTS

The invention relates to an arrangement for measuring the relative distance of closely adjacent objects, in which the chamber of a distance measuring sensor filled with liquid, which chamber is bounded by a diaphragm-like wall, is reduced in volume by deflection, a part of the liquid escaping into an ascending conduit visible from the outside.

DE PS No. 29831 discloses an arrangement of the kind mentioned in the opening paragraph, in which a bolt displaceable in its axial direction compresses the diaphragm of a box filled with liquid, while a part of the liquid ascends in a narrow pipe. This arrangement consists of a large number of component parts, is comparatively voluminous and cannot be inserted into the space between closely adjacent objects so that it is not suitable for use as a distance measuring sensor, especially in needle printers.

The invention has for its object to construct a measuring arrangement of the kind mentioned in the opening paragraph so that it is so easy to manipulate and so small that it is suitable for use as distance sensor jig for measuring and/or adjusting the relative distance of closely adjacent objects, more particularly between the printing head and the rollers in needle printers.

According to the invention, this object is achieved in that the distance measuring sensor comprises a rigid base layer, to which a solid intermediate layer is applied, which has recesses for forming the chamber and the ascending conduit adjoining an opening of the chamber, which are closed by the rigid base layer and by a rubber-elastic at least partly transparent covering layer.

The rubber-elastic covering layer acting as a diaphragm at the area of the chamber has such a small return force that no elastic displacement of the objects, between which the distance is measured, which would falsify the measuring result, is obtained thereby.

In such a sensitive distance measuring sensor, however, atmospheric air pressure variations can become manifest in a disturbing manner in the measuring result in case the liquid is present in a chamber closed on all sides. In order to avoid this, for example, a porous layer pervious to gas forming the connection with the atmosphere may be located at the end of the ascending conduit remote from the chamber.

In order that it can be clearly and rapidly ascertained whether liquid has escaped from the distance measuring sensor, an absorptive layer may be located at the end of the ascending conduit remote from the chamber, which layer is coloured by the liquid present in the ascending conduit in a contrasting manner.

In order to improve the readability of the liquid level at the ascending conduit provided with a marker, the liquid may be coloured with a contrasting dye.

In order to keep the influence of the temperature on the measurement as small as possible, a material may be chosen for the solid intermediate layer which has such a longitudinal expansion coefficient that the depth of the ascending conduit increases upon an increase of the ambient temperature to such an extent that the increase of the volume of the liquid is substantially compensated for.

A constructively simple arrangement consisting of punched parts is obtained if the ascending conduit has a rectangular cross-section.

For limiting the maximum deflection of the elastic covering layer beyond the admissible value, a thin rigid metal plate having a base area which is smaller than that of the chamber may be secured to the bottom of the chamber. It has also been found that by this measure the rubber-elastic covering layer is prevented from adhering to the bottom of the chamber.

The ascending conduit may advantageously have at its end a widened part, which serves as an expansion cavity and by which excess liquid is collected when the elastic covering layer is compressed excessively. Further, air bubbles present in the ascending conduit may be discharged into the expansion cavity in that a pressure is exerted on the rubber-elastic covering layer.

An embodiment of the invention will now be described more fully with reference to the accompanying drawing, in which:

FIG. 1 is a plan view of a distance measuring sensor according to the invention, and FIG. 2 is a longitudinal sectional view taken on the line of intersection I—I in FIG. 1.

The distance measuring sensor 1, which, as can be seen from the sectional view of FIG. 2, is located between the printing head 2 and the roller 3 of a needle printer, essentially consists of three strip-shaped foils glued onto each other. A rigid base layer 4 is located directly at the roller 3 as the lowermost foil, which base layer consists of a thin strip of high-grade steel and thus provides for the required rigidity of the distance measuring sensor 1. On this base layer 4 is disposed an intermediate layer 5 of a solid synthetic material, on which is disposed a transparent covering layer 6, which consists of an elastic synthetic material of considerably higher resilience. The intermediate layer 5 has recesses for the formation of a chamber 7 and the ascending conduit 8, which are closed by the base layer 4 and the covering layer 6. The recesses are obtained by a punching operation, At the end of the ascending conduit 8 is provided a tub-shaped widened part 9. A round plate 10 is secured at the bottom of the chamber 7 on the surface of the base layer 4, which plate on the one hand prevents the covering layer 6 from adhering to the base layer 4 when the elastic covering layer 6 is compressed excessively at the area of the chamber 7 and on the other hand limits the maximum deflection of the covering layer 6 so that the liquid cannot be pressed out of the chamber 7 over too large a distance. Even when the covering layer 6 is compressed entirely, an annular conduit 17 filled with liquid is left.

Since different atmospheric air pressures with an ascending conduit 8 scaled in an air-tight manner would falsify the measuring result, a hood permeable to air closes the open end of the ascending conduit 8. This hood 11 could consist of a material impermeable to liquid. In the embodiment, however, an inexpensive absorptive material was used, which does not prevent the liquid from escaping, but which indicates in this case that the arrangement has become unserviceable. The liquid level can be readily read during measurement with reference to the markers 12 provided as a scale with an upper limit value 16 and a lower limit value 16' in the central region of the ascending conduit 8. Moreover, when the limit values 16, 16' are exceeded, an inadmissible distance between the printing head 2 and the roller 3 is indicated, which necessitates a corresponding readjustment. Reading is facilitated by colouring the liquid with a contrasting dye.

For measuring the air gap between the roller 3 and the printing head 2, the distance measuring sensor 1 is manually inserted in such a manner with its slightly wider lower end 13 between the roller 3 and the printing head 2 that the elastic covering layer 6 engages the printing head 2 and the rigid base layer 4 engages the roller 3 at the area of the chamber 7. Depending upon the distance between the roller 3 and the printing head 2, the covering layer 6 is bent at the area of the chamber 7 over a larger or a smaller distance towards the bottom 15 of the chamber 7. The volume of the chamber filled with a coloured liquid is then varied, while the liquid level is also correspondingly varied, which at normal distances between the printing head 2 and the roller 3 lies in the range defined by the limit values 16, 16' on the marker 12 of the ascending conduit 8.

When the elastic covering layer 6 is bent excessively, for example in the case of an inexpert use of the distance measuring sensor 1, the excess liquid can be discharged into the widened part 9 in the form of an overflow container at the end of the ascending conduit 8.

What is claimed is:

1. An arrangement for measuring the relative distance of closely adjacent objects including a distance measuring sensor having a chamber filled with liquid, said chamber being bounded by a diaphragm-like wall, a transparent ascending conduit connected to said chamber for receiving liquid therefrom, wherein the distance measuring sensor comprises a rigid base layer, an intermediate layer of solid synthetic material abutting said rigid base layer, said intermediate layer having recesses which form said chamber and said ascending conduit, and an elastic covering layer abutting said intermediate layer, said covering layer having a transparent section over at least part of said ascending conduit whereby someone looking through said transparent section can see the height of liquid, if any, in said ascending conduit, said three layers closing said chamber and said ascending conduit to the surrounding atmosphere except for the end of said ascending conduit remote from said chamber.

2. An arrangement as claimed in claim 1, wherein a porous layer pervious to gas, which forms a connection with the surrounding atmosphere, is located at the end of the ascending conduit (8) remote from the chamber (7).

3. An arrangement as claimed in claim 1, wherein an absorptive layer (11), which can be coloured in a contrasting manner by coming into contact with liquid present in the ascending conduit (8), is located at the end of the ascending conduit (8) remote from the chamber (7).

4. An arrangement as claimed in claim 2 or 3, wherein the liquid used is coloured in a contrasting manner.

5. An arrangement as claimed in claim 1, wherein the material of the intermediate layer (5) has such a longitudinal expansion coefficient that the depth of the ascending conduit (8) increases upon an increase of the ambient temperature to such an extent that the increase in volume of the liquid is substantially compensated for.

6. An arrangement as claimed in claim 1, wherein the ascending conduit (8) has a rectangular cross-section.

7. An arrangement as claimed in claim 1, wherein a thin and rigid plate (10) having a base area which is smaller than that of the chamber is secured at the bottom (15) of the chamber (7).

8. An arrangement as claimed in claim 1, wherein the end of the ascending conduit (8) remote from the chamber has a widened part (9) serving as an expansion cavity.

9. An arrangement as claimed in claim 8, wherein a scale (12) with limit values (16, 16') is provided for use in measuring the height of liquid in the ascending conduit (8).

* * * * *